United States Patent [19]
Azoulay et al.

[11] 3,804,714
[45] Apr. 16, 1974

[54] ENZYMIC OXIDATION PROCESS

[75] Inventors: Edgar Elite Yves Azoulay, Marseille; Jean-Michel Marie Joseph Lebeault, Lavera, both of France

[73] Assignee: The British Petroleum Company Limited, London, England

[22] Filed: June 23, 1972

[21] Appl. No.: 265,563

[52] U.S. Cl............................................. 195/28 R
[51] Int. Cl.............................................. C12b 1/00
[58] Field of Search........................ 195/28 R, 51 R

[56] References Cited
UNITED STATES PATENTS
3,326,771　6/1967　Leavitt.............................. 195/28 R
3,326,772　6/1967　Leavitt.............................. 195/28 R OTHER PUBLICATIONS
Azoulay et al. "Isolation & Characterization of Enzymes Responsible for the Oxidation of Hydrocarbons" Biochimica & Biophysica Acta, Vol. 77, pp. 554–567 (1963).

*Primary Examiner*—A. Louis Monacell
*Assistant Examiner*—R. B. Penland
*Attorney, Agent, or Firm*—George B. Finnegan, Jr.

[57]　　　　　ABSTRACT

Enzymic process for the oxidation of substantially water immiscible or water insoluble hydrocarbons, alcohols or aldehydes using oxidising enzyme extracted from micro-organisms wherein an amide is used to dissolve the hydrocarbon, alcohol or aldehyde and thereafter the solution is dispersed in an aqueous buffer in which the oxidation is effected.

5 Claims, No Drawings

ENZYMIC OXIDATION PROCESS

This invention is concerned with improvements in and relating to a method for the oxidation of substantially water immiscible or water insoluble hydrocarbons, alcohols or aldehydes using an enzyme or an enzyme complex extracted from the cells of microorganisms.

Processes have been proposed for the oxidation of hydrocarbons, alcohols or aldehydes using enzymes extracted from the cells of micro-organisms. Methods for obtaining enzymes or enzyme complexes which are suitable for use in these oxidation processes have been described in the literature.

An object of the present invention is to provide an enzymic oxidation process having an improved reaction rate.

The process according to the present invention for the enzymic oxidation of a substantially water immiscible or insoluble hydrocarbon, alcohol, or aldehyde, hereinafter referred to as the "substrate" comprises, forming a solution of the substrate in an amide which is miscible with both water and the substrate and having the formula

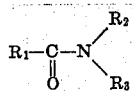

where $R_1$, $R_2$ or $R_3$ represent hydrogen or a $C_1$ to $C_5$ aliphatic group, dispersing the solution of substrate in the amide in an aqueous buffer having pH in the range 6.5 to 9.5 and in the presence of a substrate oxidising enzyme extracted from a micro-organism and a co-enzyme, to give a reaction mixture containing from a trace to 50 per cent by volume of the solution of the substrate in the amide, and maintaining the reaction mixture in the presence of oxygen at a temperature in the range 20° to 38°C, to oxidise the substrate.

Most suitably the substrate is an aliphatic hydrocarbon, alcohol or aldehyde preferably having at least six to 20 carbon atoms. Preferably the carbon atoms are arranged in a straight chain. Preferably the hydrocarbon is saturated. Some examples are n-decane, n-hexadecane, 1-decanol, 1-tetra-decanol, 1-10 decanediol, 1-10 hexadecanediol, 1-decanol and tetradecanol.

Most suitably the concentration of substrate in the reaction mixture is in the range 0.1 to 20 × $10^{-3}$ molar.

The enzymes or enzyme complexes which are suitable for use in the present process can be obtained by cultivating a hydrocarbon consuming micro-organism on a hydrocarbon as the source of assimilable carbon and extracting the enzyme or enzyme complex in known manner (See for example The Archives of Microbiology J. M. Lebeault et al. 72.140–153 1970). Suitable enzymes or enzyme complexes can be obtained from the cells of any bacterium, yeast or mould which can, or has been induced to, oxidise hydrocarbons.

A single enzyme may be used where it is desired to effect a specific oxidation step. For example an alcohol dehydrogenase can be used to oxidise an alcohol to an aldehyde. On the other hand an enzyme complex can be used where it is desired to carry out more than one oxidation step. For example an enzyme complex is used to oxidise an alkane to the corresponding acid. The chemical and physical structure of the enzymes or enzyme complexes is not known in any detail. However in the intact-micro-organism these enzymes appear to be located mainly in the mitochondria and the cytoplasm.

The amount of the enzyme or enzyme complex in the reaction mixture can be in the range 0.1 to 10 grams per litre.

Some examples of co-enzymes are, in the case of decane oxidation, nicotinamide adenine dinucleotide (NAD or NADH) which can be replaced by nicotinamide adenine dinucleotide phosphate (NADP or NADPH.)

The molarity of the co-enzyme in the reaction mixture can be in the range $10^{-2}$ to $10^{-5}$ molar.

The amides must not inactivate the enzyme or enzyme complex at least in the proportions and under the conditions which are present in the reaction mixture. The quantity of amide used is usually 10% by volume in relation to the volume of the reaction mixture. A preferred portion of amide is about 3% by volume in relation to the volume of the reaction mixture. Some examples of suitable amides are N,N-dimethyl formamide, formamide, N,N-diethyl formamide, N-ethyl formamide, and N-methyl formamide.

The aqueous buffer can be of the conventional type used in enzymic reactions such as for example a trishydrochloric acid or phosphate buffer.

The reaction conditions whereby the oxidation can be effected are the relatively mild conditions which are generally used for conducting enzymic reactions. For example the temperature can be in the range 20° to 38°C and preferably in the range 22° to 25°C. Most suitably the pH is in the range 7.5 to 8.5 for the oxidation of n-alkanes to alcohols or acids and for the oxidation of aldehydes to acids. On the other hand most suitably, the pH is in the range 8.5 to 9.5 for the oxidation of alcohols to aldehydes.

The oxygen can be present as free oxygen, for example the oxygen present in the air. On the other hand bound oxygen can be used such as for example the oxygen present in a hydroxyl group or water.

The process of the present invention can be used for the oxidation of diols to omega-hydroxy acids for example decanediol can be oxidised to hydroxy decanoic acid. Hydrocarbons can be converted to either the alcohol or acid. The alcohols can be converted to either the aldehyde or the acid and the aldehydes to the acid.

The following examples are given by way of illustration of the present process.

EXAMPLE 1

Seventy milligrams of decane were dissolved in 1 millilitre of dimethyl formamide. 0.1 millilitres of this solution were mixed with 3 millilitres of an aqueous trishydrochloric acid buffer containing a decane oxidising enzyme complex and a co-enzyme. The pH of the buffer was 8.0 and the decane had a molarity of 18.0 × $10^{-3}$ in the mixture.

The decane oxidising enzyme was obtained by cultivating yeast, Candida tropicalis, on n-tetradecane as the carbon source. The cultivated broth was centrifuged to recover a cream containing yeast cells. The cells were washed with an isotonic solution of sodium chloride and suspended in a tris hydrochloric acid buffer at a pH of 7.8. The cell suspension was passed through a French Pressure Cell and the product centrifuged at 4,000 g. for 20 minutes. The supernatant liquid had a concentration of 10 to 20 milligrams of protein per millilitre. One milligram of the supernatant liquid (which contained the decane oxidising enzyme complex) was added to the mixture previously described.

The co-enzyme, nicotinamide adenine dinucleotide phosphate (NADPH) was added to the mixture to give a molarity of $17 \times 10^{-3}$.

The mixture was incubated for 30 minutes at 25°C in the presence of atmospheric oxygen. Analysis of the mixture then showed that 85 per cent by weight of the decane had been oxidised to a mixture of decanol and decanoic acid. The proportions of decanol and decanoic acid were respectively 20 per cent and 65 per cent by weight.

EXAMPLE 2

This is an example of the oxidation of 1-10 decanediol to 10-hydroxy decanoic acid. The same procedure was used as that described for Example 1 except that the decane was replaced by a similar weight of 1-10 decanediol. A 70 to 80 per cent by weight yield of 10-hydroxy decanoic acid was obtained.

EXAMPLE 3

This is an example of the oxidation of decanol to decanoic acid. The same procedure was used as that described in Example 1 except that decane was replaced by decanol. A 95 to 98 per cent by weight yield of decanoic acid was obtained.

Comparative Experiment

By way of comparison decane was oxidised to decanol and decanoic using the same procedure as that described in Example 1 with the essential difference that dimethyl formamide was omitted and the mixture was agitated in an attempt to promote the reaction. Analysis of the mixture showed that only 10 percent by weight of the decane had been oxidised to a mixture of decanol and decanoic acid. The proportions of decanol and decanoic acid were respectively 20 per cent and 65 per cent by weight.

We claim:

1. A process for the enzymic oxidation of a substantially water insoluble carbon containing substrate selected from the group consisting of a hydrocarbon, alcohol, and aldehyde which process comprises forming a solution of the substrate in an amide which is miscible with both water and the substrate and having the formula:

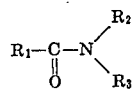

where $R_1$, $R_2$ and $R_3$ are each selected from the group consisting of hydrogen and a $C_1$ to $C_5$ aliphatic group, dispersing the solution of substrate in the amide in an aqueous buffer solution having a pH in the range 6.5 to 9.5 and in the presence of a substrate oxidising enzyme extracted from a microorganism and a co-enzyme, to give a reaction mixture containing from a trace to 50 percent by volume of the solution of the substrate in the amide, and maintaining the reaction mixture in the presence of oxygen at a temperature in the range 20° to 38°C, to oxidise the substrate.

2. A process as claimed in claim 1 wherein the concentration of the substrate in the reaction mixture in the range 0.1 to $20 \times 10^{-3}$ molar.

3. A process as claimed in claim 1 wherein the substrate oxidising enzyme is a complex which is capable of carrying out more than one oxidation step.

4. A process as claimed in claim 1 wherein the substrate is an aliphatic hydrocarbon having at least six to 20 carbon atoms.

5. A process as claimed in claim 1 wherein the amide is dimethyl formamide.

* * * * *

PO-1050
(5/69)

UNITED STATES PATENT OFFICE
CERTIFICATE OF CORRECTION

Patent No. 3,804,714     Dated April 16, 1974

Inventor(s) Edgar Elie Yves Azoulay and Jean-Michel Marie Joseph Lebeault

It is certified that error appears in the above-identified patent and that said Letters Patent are hereby corrected as shown below:

Introduction page, line 2, change Inventor's name "Edgar Elite Yves Azoulay" to -- Edgar Elie Yves Azoulay --.

Signed and sealed this 9th day of July 1974.

(SEAL)
Attest:

McCOY M. GIBSON, JR.
Attesting Officer

C. MARSHALL DANN
Commissioner of Patents